(12) United States Patent
Monnerat (10) Patent No.: US 7,750,844 B2
(45) Date of Patent: Jul. 6, 2010

(54) METHOD OF UPDATING THE CLOCK BIAS BETWEEN A GSM NETWORK BTS AND GPS SATELLITES

(75) Inventor: Michel Monnerat, L'Union (FR)

(73) Assignee: Alcatel Lucent, Paris (FR)

( * ) Notice: Subject to any disclaimer, the term of this patent is extended or adjusted under 35 U.S.C. 154(b) by 752 days.

(21) Appl. No.: 10/583,039

(22) PCT Filed: Dec. 6, 2004

(86) PCT No.: PCT/FR2004/003135

§ 371 (c)(1),
(2), (4) Date: Jul. 11, 2006

(87) PCT Pub. No.: WO2005/059583

PCT Pub. Date: Jun. 30, 2005

(65) Prior Publication Data

US 2008/0278373 A1    Nov. 13, 2008

(30) Foreign Application Priority Data

Dec. 16, 2003    (FR) ................... 03 14699

(51) Int. Cl.
*G01S 1/02* (2010.01)
*G01C 21/00* (2006.01)

(52) U.S. Cl. .......................... 342/357.09; 342/357.06; 701/213

(58) Field of Classification Search ............ 342/357.06, 342/357.08, 357.09, 357.14; 701/207, 213; 455/432.1, 456.6
See application file for complete search history.

(56) References Cited

U.S. PATENT DOCUMENTS

| 6,429,808 | B1 | 8/2002 | King |
| 6,429,811 | B1 | 8/2002 | King et al. |
| 7,504,996 | B2* | 3/2009 | Martin ................ 342/357.12 |
| 2002/0173322 | A1 | 11/2002 | Garin et al. |
| 2003/0187575 | A1 | 10/2003 | King |
| 2005/0093742 | A1* | 5/2005 | Lee et al. ............... 342/357.15 |

FOREIGN PATENT DOCUMENTS

WO        WO 03/067396 A    8/2003

* cited by examiner

Primary Examiner—Dao L Phan
(74) Attorney, Agent, or Firm—Fay Sharpe LLP (57) ABSTRACT

The present invention relates to a method of updating the clock bias between the common clock of the satellites of a radio navigation satellite system and the clock of a radio station of an asynchronous cellular radiotelephone system including a mobile device including a radio navigation satellite system receiver for receiving satellite data supplied by at least four satellites and an assistance server for improving the acquisition of satellite data by the mobile device. The method includes the steps of the mobile device receiving the satellite data, the mobile device calculating pseudodistances between itself and the satellites, encapsulating the pseudodistances with the time at which the pseudodistances are calculated, transmitting the pseudodistances and the time at which the pseudodistances are calculated in the form of a radio signal from the mobile device to the assistance server via the radio station, and the assistance server determining the position of the mobile device and estimating the clock bias between the common clock of the satellites and the clock of the radio station using the pseudodistances and the time at which the pseudodistances are calculated.

20 Claims, 5 Drawing Sheets

METHOD OF UPDATING THE CLOCK BIAS BETWEEN A GSM NETWORK BTS AND GPS SATELLITES

CROSS-REFERENCE TO RELATED APPLICATIONS

This application is based on French Patent Application No. 0314699 filed Dec. 16, 2003, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of updating the clock of a radio station of a cellular radiotelephone system including an assistance server for improving the acquisition of satellite data.

2. Description of the Prior Art

In the field of mobile telephony, it is proving increasingly necessary to be able to locate mobile telephones.

To this end, it is known in the art to associate a cellular radiotelephony device, for example of the Global System for Mobile communications (GSM) mobile telephone type, with a radio navigation satellite system (RNSS) receiver such as a Global Positioning System (GPS), GLONASS or GALILEO type receiver, by means of which the mobile device picks up transmissions from satellites to determine its position. Thus in the event of a road traffic accident, for example, the mobile device can calculate and transmit its position.

The position of the device may be determined in the following manner: a plurality of satellites transmit continuously a time-stamped signal that is picked up by the receiver. If it is synchronized to the clock of the satellites, the receiver can then measure the propagation time of this signal and deduce therefrom the distance between it and a particular satellite. A receiver of the above kind can determine its position by triangulation using three satellites. Each propagation time measurement represents the radius of a sphere centered on a particular satellite, the receiver being situated on that sphere. With two distance measurements, the position of a receiver is within a circle formed by the intersection of two spheres. A simultaneous third measurement reduces the intersection to two points, one of which is at a great distance away in space and is easily ignored.

However, because it is not totally synchronous with the GPS, the clock of the receiver is affected by a clock bias $\Delta T$. In fact, the atomic clocks of GPS satellites are very accurate but the accuracy of the more rudimentary GPS receiver is fatally lower. The clock bias $\Delta T$ is the time difference between the receiver clock and the satellite clock and may be as high as several seconds. It is reflected in an error in measuring the GPS signal propagation time and thereby an error $c.\Delta T$ in the satellite-receiver distance, where c is the speed of light. This error affects all distances measured by the receiver. As the distances are not perfect because they are affected by the time bias, they are called pseudodistances. The time bias is unknown a priori and must be determined.

There is therefore a fourth unknown, for which it is necessary to measure at least one additional distance, and therefore to use at least four satellites, in order to solve a system of four equations in four unknowns.

The signal sent by each satellite is a signal whose spectrum has been spread by a phase-modulated pseudorandom code; the GPS receiver must acquire this signal. The receiver generates locally a replica of the signal and then delays the start of this replica until it is superimposed on that coming from the satellite. The delay is determined by correlating the two signals. The value of this delay is the time taken by the signal to propagate from the satellite to the user. This kind of measurement demands extremely high accuracy (better than 100 nanoseconds). The time taken by the signal to travel this distance is of the order of 50 milliseconds. However, because the clock of the GPS receiver is never fully synchronized to that of the satellites, the receiver has to adjust its clock constantly by a process of successive approximations to arrive at the maximum correlation of the two signals. Acquisition of the signal therefore necessitates a time sweep by the receiver.

Furthermore, the signal transmitted by each satellite is transmitted at a known frequency of 1575.42 MHz. The Doppler shift of the satellite, on which is superimposed a receiver local clock uncertainty, results in an uncertainty of ±5 kHz in respect of the signal received by the GPS receiver. Now, to obtain a good correlation, the signal generated locally by the receiver must have the same frequency as the signal transmitted by the satellite. The receiver must therefore perform a frequency sweep, in addition to the time sweep, in order to determine the time taken by the signal to propagate from the satellite to the user.

The time and frequency sweeps referred to above imply a very long data processing time and require a receiver having a very high computation power.

Figure 1:
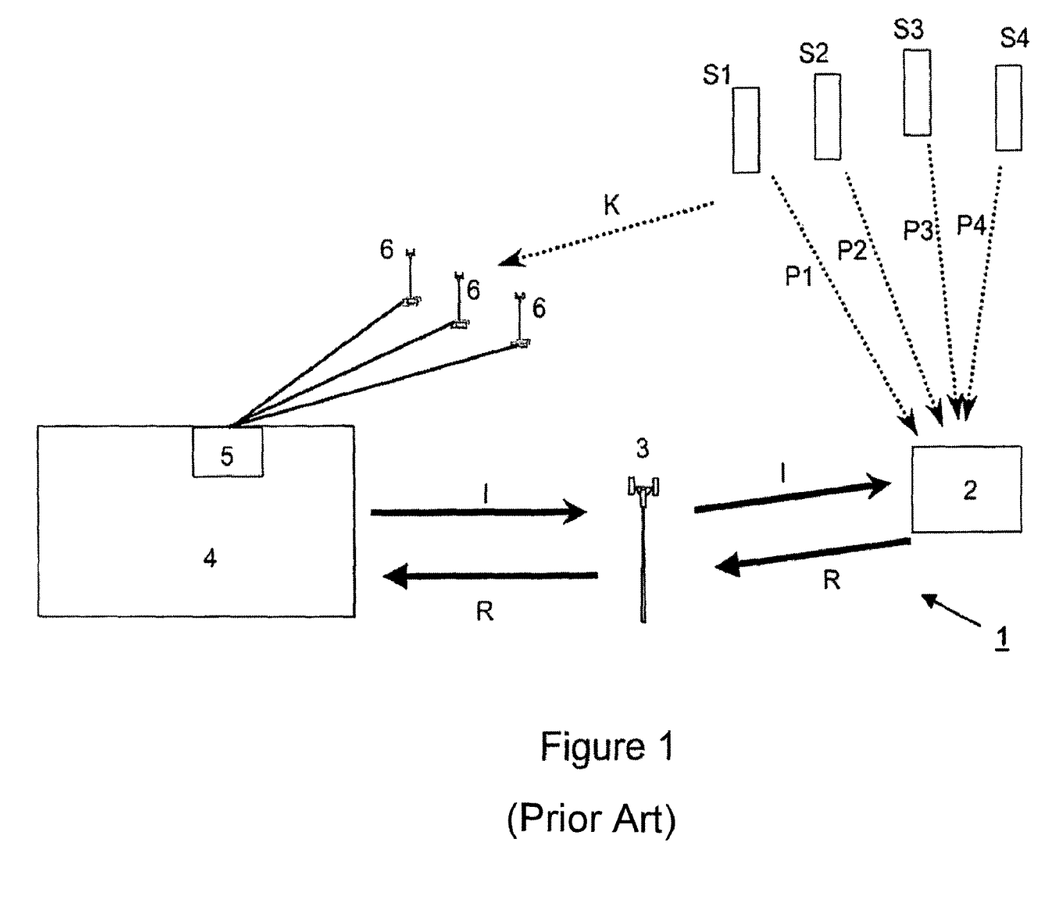
FIG. 1 represents a prior art telecommunication system.

One solution is to use a server to assist the GPS receiver of the mobile device by increasing its sensitivity by curtailing the time-frequency area to be swept. A server of this kind is described in "Indoor GPS Technology" (F. van Diggelen et al., CTIA Wireless-Agenda, Dallas, May 2001). This technology is known as the assisted GPS (A-GPS) technology. FIG. 1 represents a telecommunication system 1 using an assistance server 5 of this kind. A mobile device 2 including a GPS receiver, such as a mobile telephone in a GSM type telephone network 4, is seeking to calculate its position from signals P1 to P4 transmitted by at least one of four satellites S1 to S4. To this end, the device 2 sends a request R in the form of a radio signal over the telephone network 4. The request R passes through a base transceiver station (BTS) type radio base station 3 associated with the cell in which the mobile device 2 is located. The request R is processed by the server 5, which receives satellite information in real time via fixed radio stations 6 equipped with GPS receivers receiving information K. In response to the request R, the server 5 sends to the mobile device 2 information I that passes through the BTS 3. The information contains, for example, the ephemerides of the satellites S1 to S4. Using that information, the mobile device 2 can determine the Doppler shift of the satellites and considerably curtail its frequency sweep. Note that there are two types of A-GPS technology, namely mobile station based (MS-based) and mobile station assisted (MS-assisted). In the case of the MS-based technology, the position of the mobile device 2 is calculated by the mobile device itself. In the case of the MS-assisted technology, the position of the mobile device 2 is calculated by the server 5.

In the synchronous code division multiple access (CDMA (or CMA 2000)) telephone networks used in the USA, the time sweep is much less critical since each of the transceivers is synchronized. Thus using an assistance server with a synchronous network greatly curtails the time and frequency sweep. On the other hand, in the case of an asynchronous network such as a GSM or UMTS network using time division multiple access (TDMA), the time sweep aspect remains very important even if an assistance server is used, because the transceiver clocks may vary considerably.

One prior art solution to this problem is described in the document "Analysis of GPS time-transfer accuracy in GSM and UMTS networks and possibilities to improve sensitivity" (J. Syrjärinne, ION GPS 2002, 24-27 Sep. 2002) and consists in equipping each base transceiver station (BTS) 3 with a GPS receiver, as shown in FIG. 1. The base station 3 can therefore, after calculating its position and the clock bias between itself and the satellites, determine the common clock of the satellites and transmit that GPS clock to the mobile device 2 by marking the information signal 1. The clock transmitted to the mobile device 2 is fairly accurate in that it is affected only by the transmission time of a few microseconds between the base station 3 and the mobile device 2. This transmission time is short because the mobile device 2 is in the cell associated with the base station 3 and the diameter of a cell such as a GSM cell varies from 300 m to 30 km, depending on terrain and population density.

However, implementing a solution of the above kind causes certain difficulties. Thus this solution is extremely costly, because it entails many modifications of the network and installing a GPS receiver in each BTS type radio base station.

The present invention aims to provide a method of updating the clock bias between the common clocks of the satellites of a radio navigation satellite system and the clock of a BTS type radio station of an asynchronous cellular radiotelephone network such as a GSM network, said method enabling mobile devices in said cellular network equipped with an radio navigation satellite system receiver to access this clock bias in a simple and economical way.

SUMMARY OF THE INVENTION

To this end the invention proposes a method of updating the clock bias between the common clock of the satellites of a radio navigation satellite system and the clock of a radio station of an asynchronous cellular radiotelephone system including a mobile device including a radio navigation satellite system receiver for receiving satellite data supplied by at least four satellites and an assistance server for improving the acquisition of satellite data by the mobile device, the method including the following steps:
- the mobile device receiving the satellite data,
- the mobile device calculating pseudodistances between itself and the satellites,
- encapsulating the pseudodistances with the time at which the pseudodistances are calculated,
- transmitting the pseudodistances and the time at which the pseudodistances are calculated in the form of a radio signal from the mobile device to the assistance server via the radio station, and
- the assistance server determining the position of the mobile device and estimating the clock bias between the common clock of the satellites and the clock of the radio station using the pseudodistances and the time at which the pseudodistances are calculated.

Thanks to the invention, in an asynchronous network of the GSM type, an assistance server such as an A-GPS server, by using the pseudodistances and the time at which said pseudodistances are calculated, knows the clock bias between a radio station such as a BTS and the satellites of a radio navigation satellite system such as the Global Positioning System. Thus the clock bias of a particular radio station is updated each time that an assistance server calculates the position of a mobile device in a cell type area associated with said station: this applies to mobile devices using an MS-assisted technology. This updating method is therefore a self-supported, simple and economical method that does not necessitate any structural modification of the network, such as adding radio navigation satellite system receivers to all the radio stations.

In a first embodiment, the time at which the pseudodistances are calculated corresponds to time information supplied by the radio station.

Thus the time at which the pseudodistances are calculated is determined on the basis of the signal exchanged between the mobile device and the radio stations; in the case of a GSM signal, for example, the pseudodistances are time-stamped by means of the structure of the GSM message, which is divided into hyperframes in turn divided into superframes in turn divided into multiframes in turn divided into frames in turn divided into bit periods; a number corresponding to the pseudodistances calculation time may be associated with each of these elements (hyperframe, superframe, multiframe, frame, bit). The server then determines the position of the mobile device and the time difference between the time-stamp of the pseudodistance calculation and the clock of the GPS satellites. The server therefore has direct access to the clock bias between the clock of the radio station and the GPS clock.

In a second embodiment, the time at which the pseudodistances are calculated is the time according to the clock of the mobile device at which the pseudodistances are calculated, the method including the following steps:
- the mobile device inserting into the radio signal the time it sends the radio signal,
- the radio station inserting into the radio signal the time it receives the radio signal,
- the assistance server determining a first clock bias between the clock of the mobile device and the common clock of the satellites,
- the assistance server estimating a second clock bias between the clock of the mobile device and the clock of the radio station by establishing the difference between the sending time and the receiving time, and
- deducing the clock bias between the common clock of the satellites and the clock of the radio station by establishing the difference between the first and second clock bias values.

In this embodiment, the assistance server, such as an A-GPS server, knows the clock bias between the radio station BTS and the GPS satellites from the difference between the two clock bias values. Note here that the second clock bias, which is that between the clock of the mobile device and the clock of the radio station, is determined by the server by establishing the difference between the time-stamp for sending by the mobile and the time-stamp for reception by the station. This second clock bias is accurate to within the travel time between the mobile and the station. That travel time is of the order of a few microseconds and is negligible compared to the second clock bias values, which are of the order of several seconds.

The clock bias between the common clock of the satellites and the clock of the radio station is advantageously stored in an update database.

The present invention further provides an assistance server for improving the acquisition of satellite data by a mobile device, the server including a database for the clock bias between the clock of the radio stations of an asynchronous cellular radiotelephone system and the common clock of the satellites of a radio navigation satellite system.

The clock bias values are advantageously updated by a method according to the invention.

The present invention further provides a method of improvement by an assistance server of the acquisition of satellite data by a mobile device including a radio navigation satellite system receiver in an asynchronous cellular radiotelephone system, the method including the following steps:

the mobile device sending an assistance request to the assistance server via a radio station associated with it, and the server identifying the clock bias between the common clock of the satellites and the clock of the radio station as updated by an updating method according to the invention.

Thus the improvement method relying on an assistance server advantageously uses the method of the invention of updating the clock bias.

A first embodiment of the method includes a step of the assistance server transmitting assistance data including:

time information associated with the radio station extracted from the clock bias between the common clock of the satellites and the clock of the radio station as updated by the updating method, and the time of the common clock of the satellites extracted from the clock bias between the common clock of the satellites and the clock of the radio station as updated by the updating method.

It is advantageous if the time information associated with the radio station is transferred as a reference time of the BTS radio signal in the form of hyperframe, superframe and multiframe references and a bit number, and the time of the common clock of the satellites is associated with the BTS reference date.

A second embodiment of the method includes the following steps:

the assistance server transmitting assistance data including a clock bias between the common clock of the satellites and the clock of the radio station as updated by the updating method, and the radio station inserting into a radio signal sent to the mobile device the time the radio station sends the radio signal.

Thus the assistance data supplied to a mobile device includes the updated clock bias between the common clock of the satellites and the clock of the radio station associated with the mobile device. Because the radio signal further includes the time-stamp for sending of the assistance data radio signal by the radio station, the mobile device can obtain a precise estimate of its clock bias with respect to the radio station and, simply by establishing a difference, a precise estimate of its clock bias with respect to the satellites. In fact, on receiving the radio signal, the mobile knows, to within the travel time, which is negligible, the time-stamp of the clock of the base station and the clock difference between the base station and the satellite system.

The present invention further provides a method of calculating the position of a mobile device including a radio navigation satellite system receiver in an asynchronous cellular radiotelephone system, the method including the following steps:

an assistance server improving the acquisition of satellite data by the mobile device by a method according to the invention, the mobile device acquiring the satellite data, the mobile device calculating pseudodistances between the mobile device and the satellites from the satellite data, and the assistance server or the mobile device determining the position of the mobile device.

It is seen here that the method of calculating the position of a mobile device works as much for an MS-assisted type mobile device (in which the position is determined by the server) as for an MS-based type mobile device (in which the position is determined by the mobile device).

The present invention further provides a mobile device of an asynchronous cellular radiotelephone system including a radio navigation satellite system receiver and means for determining the position of the mobile device by the method according to the invention.

The present invention finally provides a method of updating the clock bias between the common clock of the satellites of a radio navigation satellite system and the clock of a radio station of an asynchronous cellular radiotelephone system including a mobile device including a radio navigation satellite system receiver for receiving satellite data supplied by at least four satellites and exchanging a radio signal with the radio station and an assistance server for improving the acquisition of satellite data by the mobile device, the method including the following steps:

the mobile device receiving the satellite data, the mobile device calculating pseudodistances between itself and the satellites, and the mobile device determining its position and estimating the clock bias between the common clock of the satellites and the clock of the radio station using the pseudodistances and the time at which the pseudodistances are calculated, the time at which the pseudodistances are calculated corresponding to time information supplied by the radio station.

A method of the above kind enables updating from a mobile device using an MS-based technology of the clock bias between the common clock of the satellites of a radio navigation satellite system and the clock of a radio station.

Other features and advantages of the present invention will become apparent in the course of the following description of one embodiment of the invention, which is given way of illustrative and nonlimiting example.

DETAILED DESCRIPTION OF THE PREFERRED EMBODIMENTS

FIG. 1 has already been described in relation to the prior art.

Figure 2:
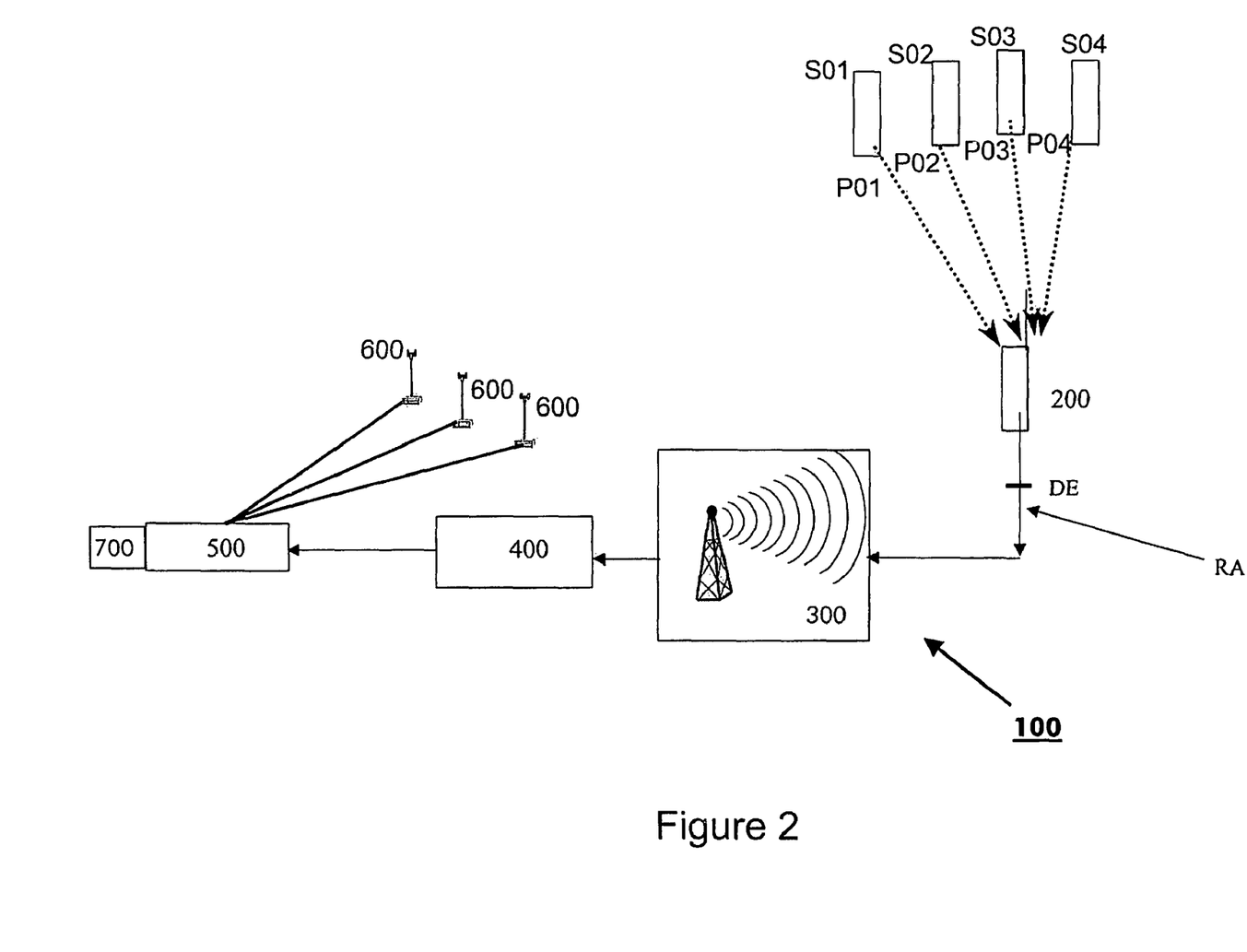
FIG. 2 represents a telecommunication system using a first embodiment of a method of the invention of updating the clock bias.

FIG. 2 represents a telecommunication system 100 including an assistance server 500. As in FIG. 1, a mobile device 200 including a GPS receiver, such as a mobile telephone of a GSM type telephone network 400, is seeking to calculate its position from pseudorandom signals P01 to P04 transmitted by four satellites S01 to S04. To this end, the device 200 sends a request, not shown, in the form of a radio signal over the telephone network 400. That request passes through a base transceiver station (BTS) type radio base station 300 associated with the cell in which the mobile device 200 is located and is processed by the server 500, which receives satellite information in real time via fixed radio stations 600 equipped with GPS receivers, not shown, for receiving that information.

The mobile device 200 calculates the pseudodistances between itself and the four satellites S01 to S04 from the signals P01 to P04 and from assistance information supplied by the server 500 enabling it in particular to determine the Doppler shift of the satellites.

The mobile device 200 uses an MS-assisted technology, i.e. its position is calculated by the server 500 and not by the mobile device 200 itself.

The pseudo-distances are therefore transmitted in the form of a radio signal RA to the assistance server 500. Before reaching the server 500, this signal RA passes through the base station 300 and then the GSM telephone network 400.

The signal RA further includes a time-stamp DE corresponding to the time of measurement of the pseudodistances by the mobile device 20. The GSM signal is used for this time-stamping. The pseudodistances are time-stamped by means of the structure of the GSM message, which is divided into superframes in turn divided into frames in turn divided into bit periods; a number corresponding to the time of calculation of the pseudodistances may be associated with each of these elements (hyperframe, superframe, multiframe, frame, bit).

The server 500 receives the signal RA after routing via the base station 300 and the network 400.

The server 500 then determines the position of the mobile device and the time difference between the pseudodistance calculation time-stamp and the clocks of the GPS satellites. The server 500 thus has direct access to the clock bias $\Delta H = H_{sat} - H_{BTS}$ between the clock $H_{sat}$ of the satellites S01 to S04 and the clock $H_{BTS}$ of the base station 300.

This clock bias $\Delta H$ is stored in a database 700 of the server 500.

In this way, in an asynchronous GSM type network, the A-GPS assistance server 500 knows the clock bias between the radio base station (BTS) 300 and the GPS satellites. The clock bias of the radio station 300 is updated each time that an assistance server calculates the position of a mobile device that is located in the cell associated with the station 300 and uses an MS-assisted technology. The updating of the database 700 each time that a mobile device using an MS-assisted technology seeks to determine its position is therefore self-supported.

Note, however, that it is equally possible to maintain the database 700 by means of a mobile device using an MS-based technology located in the cell associated with the station 300. In that case, the mobile device calculates its position itself. One solution is to calculate that position by taking for the pseudodistance calculation time reference the time-stamp of the GSM signals exchanged with the base station. Thus the mobile device simultaneously calculates its position and the clock bias $\Delta H = H_{sat} - H_{BTS}$ between the clock $H_{sat}$ of the satellites S01 to S04 and the clock $H_{BTS}$ of the base station 300. The mobile device can then forward its position and the clock bias to the server in order to update the database.

Figure 3:
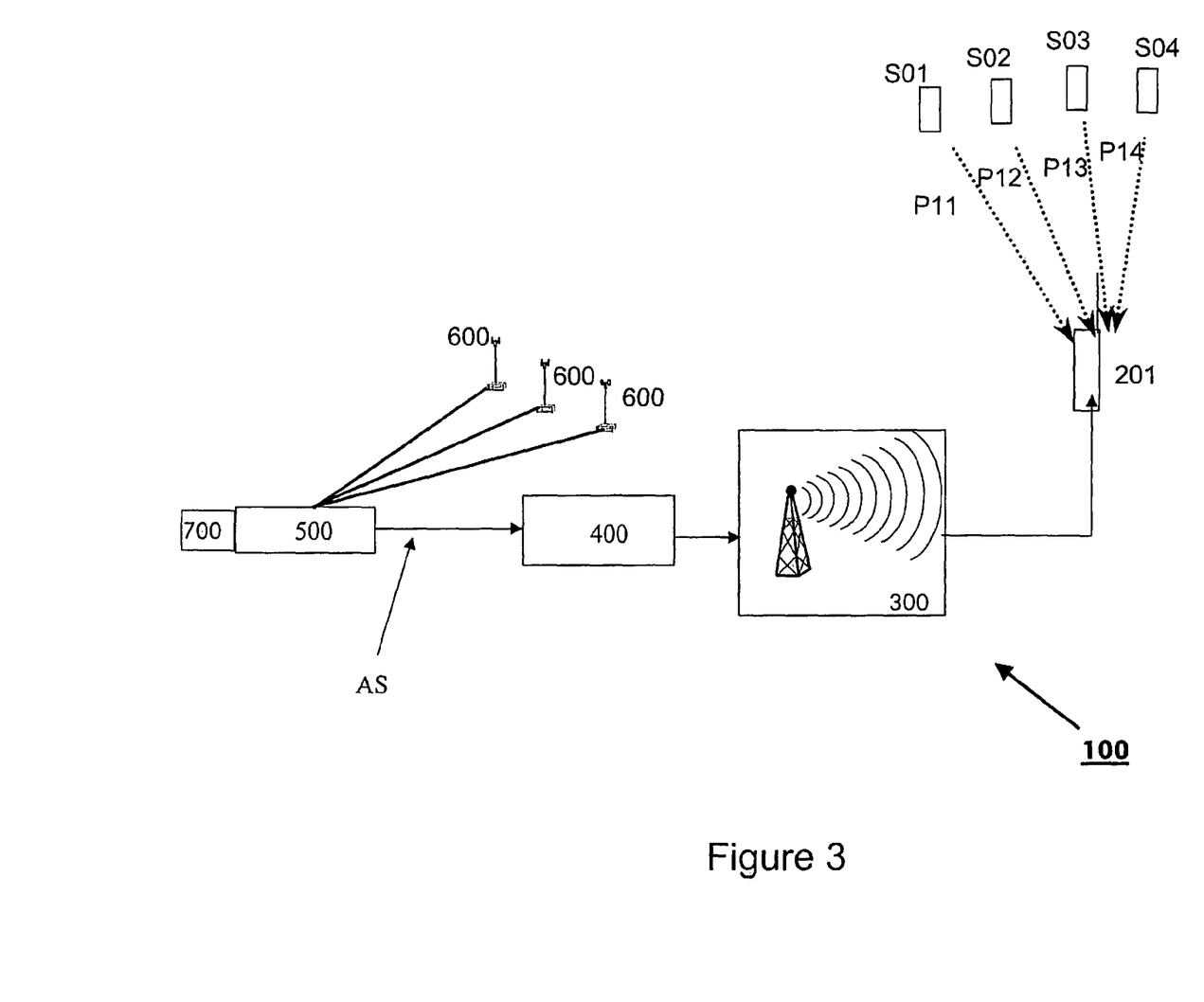
FIG. 3 represents a telecommunication system as represented in FIG. 2 using a method of improvement by an assistance server of the acquisition of satellite data in a first embodiment of the invention.

The use of the database 700, including the updating of the clock bias between the clock $H_{sat}$ of the satellites S01 to S04 and the clock $H_{BTS}$ of the base station 300, will become clear in the light of FIG. 3, which represents a system 100 identical to that of FIG. 2 except that a second mobile device 201 seeking to obtain its position relative to the satellites S01 to S04 this time receives an assistance signal AS from the assistance server 50.

To illustrate the use of the database 700, consider a mobile device 201 in the same cell as the mobile device 200 represented in FIG. 2. The assistance data AS passes through the network 400 and the base station 300 before reaching the mobile device 201.

When the server 500 receives a request for assistance, not shown, from the mobile device 200, that request includes information from which the base station 300 can be identified. The server 500 therefore searches the database 700 for the updated clock bias $\Delta H$ between the clock $H_{sat}$ of the satellites and the clock $H_{BTS}$ of the base station 300.

The server 500 extracts from this clock bias $\Delta H$ the time-stamp for calculation of $\Delta H$ by the base station and the corresponding time of the satellite clock $H_{sat}$.

This information is inserted into the assistance data signal AS, which is then transmitted to the mobile device 200 via the network 400 and the base station 300. This information may be inserted in the following manner:

transmitting a BTS time pulse locked to an event (hyperframe, superframe, multiframe, frame, bit), and associating that time pulse with a GPS time.

The mobile device 200 then knows the base station time-stamp and the corresponding time of the satellite clock $H_{sat}$. It suffices for the mobile device 200 to wait for the time-stamp for calculation of $\Delta H$ by the base station to lock onto the corresponding time of the satellite clock $H_{sat}$.

The satellite clock $H_{sat}$ enables it to synchronize its own clock and to curtail the time sweep it performs in order to acquire the pseudorandom signals P11 to P14 from the satellites S01 to S04.

The mobile device 200 uses the pseudorandom signals to calculate the pseudodistances.

Note that the mobile device 200 can use either an MS-based technology (in which case it calculates its position directly from the pseudodistances) or an MS-assisted technology (in which case it supplies the pseudodistances to the server 500, which calculates its position).

Figure 4:
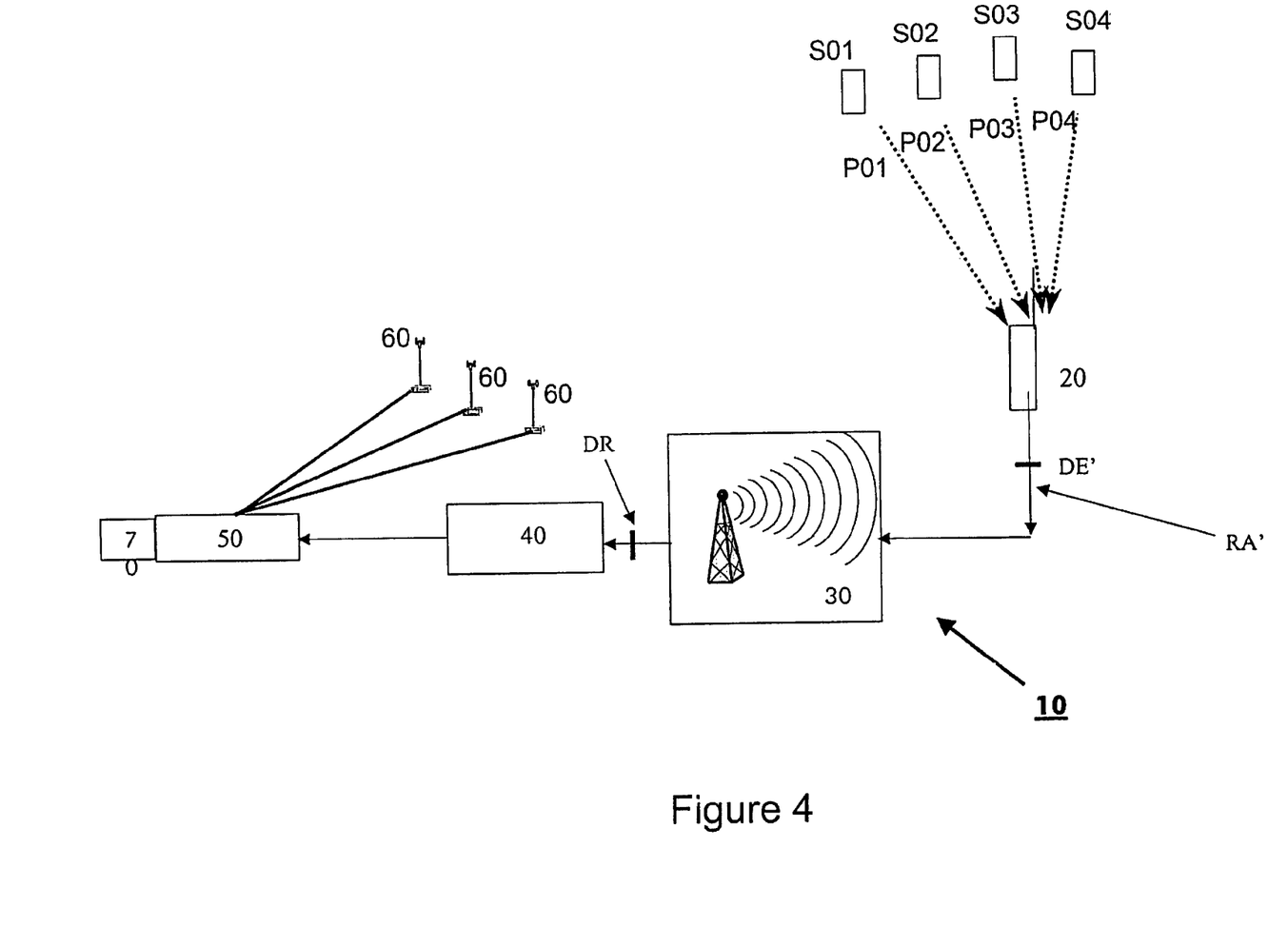
FIG. 4 represents a telecommunication system using a second embodiment of a method of the invention of updating the clock bias.

FIG. 4 represents a telecommunication system 10 including an assistance server 50. As in FIG. 1, a mobile device 20 including a GPS receiver, such as a mobile telephone of a GSM type telephone network 40, is seeking to calculate its position from pseudorandom signals P01 to P04 transmitted by four satellites S01 to S04. To this end, the device 20 sends a request, not shown, in the form of a radio signal over the telephone network 40. That request passes through a base transceiver station (BTS) type radio base station 30 associated with the cell in which the mobile device 20 is located and is processed by the server 50, which receives satellite information in real time via fixed radio stations 60 equipped with GPS receivers, not shown, for receiving that information.

The mobile device 20 calculates the pseudodistances between itself and the four satellites S01 to S04 from the signals P01 to P04 and the assistance information supplied by the server 50, enabling it in particular to determine the Doppler shifts of the satellites.

The mobile device 20 uses an MS-assisted technology, i.e. its position is calculated by the server 50 and not by the mobile device 20 itself.

The pseudodistances are transmitted in the form of a radio signal RA' to the assistance server 50. Before reaching the server 50, this signal RA' passes through the base station 30 and then the GSM telephone network 40.

The signal RA' also includes the time-stamp for the pseudodistance measurement determined from the clock of the mobile device 20.

In addition to the pseudodistance measurement time-stamp, the signal RA' includes a time-stamp DE' marked by the mobile device 20 and corresponding to the time the mobile device 20 sent the signal RA'.

The signal RA' is received by the base station 30 which stamps it with a time-stamp DR corresponding to the time the base station 30 sent said signal RA in the form of a radio signal.

The assistance server 50 receives the signal RA' time-stamped by the time-stamps DE' and DR after routing via the network 40.

The server 50 then calculates from the pseudodistances the position of the mobile device 20 and a first clock bias $\Delta H_1$ between the clock $H_{mob}$ of the mobile device 20 and the common clock $H_{sat}$ of the satellites: $\Delta H_1 = H_{mob} - H_{sat}$.

The server 50 also calculates from the time-stamps DE and DR a second clock bias $\Delta H_2$ between the clock $H_{mob}$ of the mobile device 20 and the clock $H_{BTS}$ of the base station 30: $\Delta H_2 = H_{mob} - H_{BTS}$.

Ignoring the transfer time of the signal RA from the mobile device 20 to the base station 30, which is of the order of a few microseconds, the second clock bias $\Delta H_2$ is given by the equation: $\Delta H_2 = DE - DR$.

By establishing the difference between $\Delta H_2$ and $\Delta H_1$, the server 50 obtains a third clock bias $\Delta H_3$ between the clock $H_{sat}$ of the satellites S01 to S04 and the clock $H_{BTS}$ of the base station 30: $\Delta H_3 = H_{sat} - H_{BTS}$.

This third clock bias $\Delta H_3$ is stored in a database 70 of the server 50.

In this way, in a GSM type asynchronous network, the A-GPS assistance server 50 knows the clock bias between the radio base station (BTS) 30 and the GPS satellites from the difference between the two clock bias values. The clock bias of the radio station 30 is updated each time an assistance server calculates the position of a mobile device using an MS-assisted technology located in the cell associated with the station 30. The updating of the database 70 each time that a mobile device using an MS-assisted technology seeks to determine its position is therefore self-supported.

Figure 5:
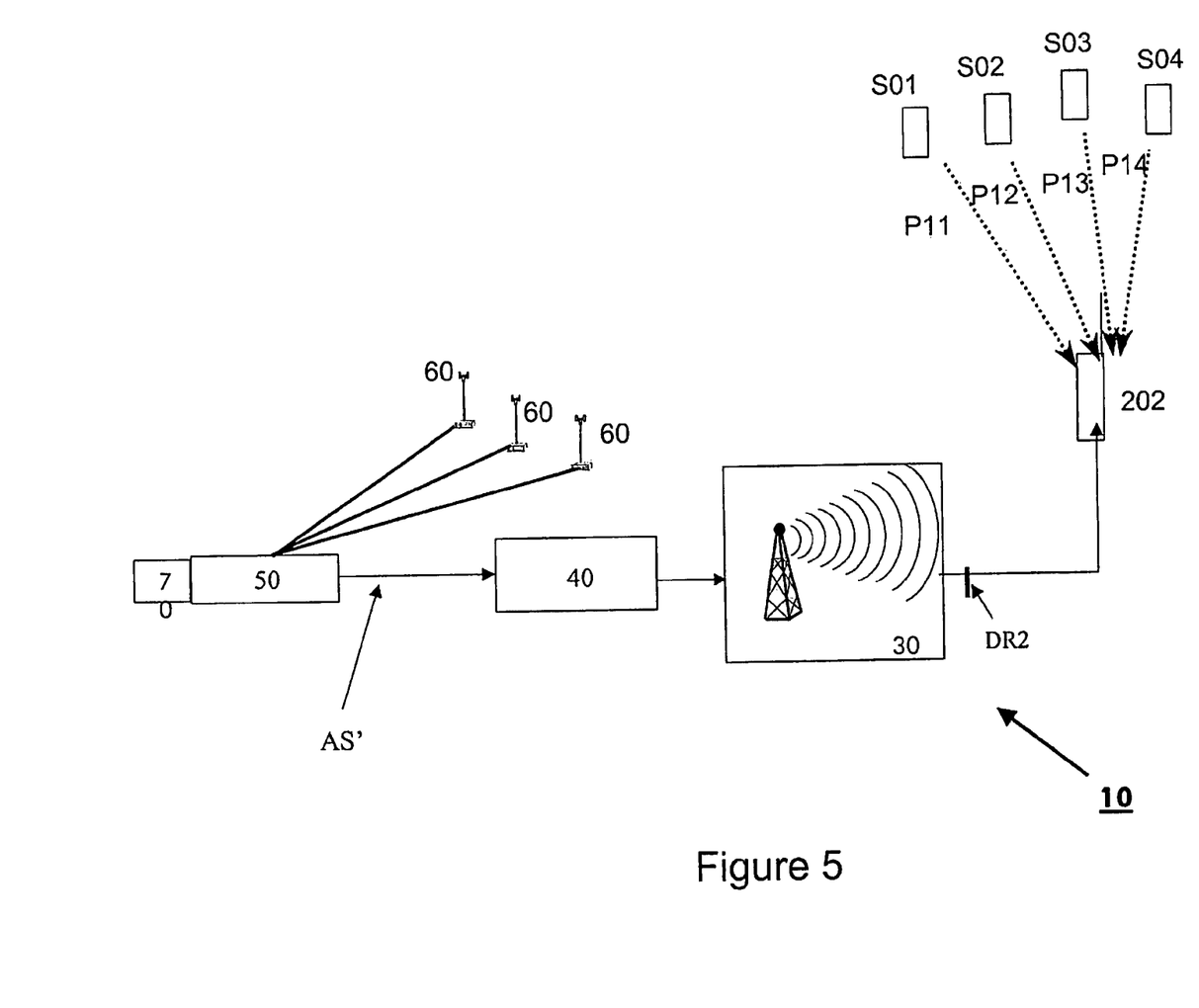
FIG. 5 represents a telecommunication system as represented in FIG. 4 using a method of improvement by an assistance server of the acquisition of satellite data in a second embodiment of the invention.

The use of the database 70, including the updating of the clock bias between the clock $H_{sat}$ of the satellites S01 to S04 and the clock $H_{BTS}$ of the base station 30, will become clear in the light of FIG. 5, which represents a system 10 identical to that of FIG. 4 except that a second mobile device 202 seeking to obtain its position relative to the satellites S01 to S04 this time receives an assistance signal AS' from the assistance server 50.

To illustrate the use of the base station 70, consider a mobile device 202 in the same cell as the mobile device 20 represented in FIG. 4. The assistance data AS' therefore passes through the network 40 and the base station 30 before reaching the mobile device 202.

When the server 50 receives an assistance request, not shown, from the mobile device 202, it searches the database 70 for the updated clock bias $\Delta H_3$ between the satellite clock $H_{sat}$ and the clock $H_{BTS}$ of the base station 30.

In a first mode of operation, that clock bias $\Delta H_3$ is used to supply the GPS time to the user (MS) in the assistance data signal AS'. One option is to provide a BTS (hyperframe, superframe, multiframe, frame, bit) reference time (i.e. a pulse) associated with a GPS time. That signal AS' is transmitted over the network 40 to the mobile device via the base station 30. Thus, on the occurrence of the BTS reference clock pulse, the mobile device 202 obtains $\Delta H_3$ and consequently the GPS time.

In a second mode of operation, the clock bias $\Delta H_3$ is inserted into the assistance data AS' which is transmitted over the network 40 to the base station 30, which stamps the signal AS' with a time-stamp DR2 corresponding to the time the station 30 receives the signal AS'.

Thus the mobile device 202 obtains $\Delta H_3$ and DR2 and can obtain the common satellite clock $H_{sat}$ by establishing the difference between the latter two values.

The clock $H_{sat}$ enables it to synchronize its own clock and to curtail considerably the time sweep required for it to be able to acquire the pseudorandom signals P11 to P14 from the satellites S01 to S04.

Those pseudorandom signals enable the mobile device 202 to calculate the required pseudodistances.

Note that the mobile device 202 can use either an MS-based technology (in which case it calculates its position directly from the pseudodistances) or an MS-assisted technology (in which case it supplies the pseudodistances to the server 50, which calculates its position).

Of course, the invention is not limited to the embodiment that has just been described.

In particular, the invention has been described in the case of the Global Positioning System but it could consist in a receiver of another radio navigation satellite system, such as a GLONASS or GALILEO type receiver.

There is claimed:

1. A method of updating the clock bias between the common clock of the satellites of a radio navigation satellite system and the clock of a radio station of an asynchronous cellular radiotelephone system including a mobile device, a radio navigation satellite system receiver for receiving satellite data supplied by at least four satellites, and an assistance server for improving the acquisition of satellite data by said mobile device,
    said method including the following steps:
    said mobile device receiving said satellite data,
    said mobile device calculating pseudodistances between itself and said satellites,
    encapsulating said pseudodistances with the time at which said pseudodistances are calculated,
    transmitting said pseudodistances and said time at which said pseudodistances are calculated in the form of a radio signal from said mobile device to said assistance server via said radio station, and
    said assistance server determining the position of said mobile device and estimating the clock bias between the common clock of said satellites and the clock of said radio station using said pseudodistances and said time at which said pseudodistances are calculated.

2. A method according to claim 1, wherein said time at which said pseudodistances are calculated corresponds to time information supplied by said radio station.

3. A method according to claim 1, wherein said time at which said pseudodistances are calculated is the time according to the clock of said mobile device at which said pseudodistances are calculated, said method including the following steps:
    said mobile device inserting into said radio signal the time it sends said radio signal,
    said radio station inserting into said radio signal the time it receives said radio signal,
    said assistance server determining a first clock bias between the clock of said mobile device and the common clock of said satellites, said assistance server estimating a second clock bias between the clock of said mobile device and the clock of said radio station by establishing the difference between said sending time and said receiving time, and deducing the clock bias between said common clock of said satellites and said clock of said radio station by establishing the difference between said first and second clock bias values.

4. A method according to claim 1, wherein said clock bias between said common clock of said satellites and said clock of said radio station is stored in an update database.

5. An assistance service for improving the acquisition of satellite data by a mobile device, wherein a server comprises a database to store a clock bias between the clock of the radio stations of an asynchronous cellular radiotelephone system and a common clock of the satellites of a radio navigation satellite system, wherein said clock bias values are updated by a method comprising the following steps:

said mobile device receiving said satellite data, said mobile device calculating pseudodistances between itself and said satellites, encapsulating said pseudodistances with a time at which said pseudodistances are calculated, transmitting said pseudodistances and said time at which said pseudodistances are calculated in the form of a radio signal from said mobile device to said server via said radio station, and said server determining the position of said mobile device and estimating the clock bias between the common clock of said satellites and the clock of said radio station using said pseudodistances and said time at which said pseudodistances are calculated.

6. A method of improvement by an assistance server of the acquisition of satellite data by a mobile device including a radio navigation satellite system receiver in an asynchronous cellular radiotelephone system, said method including the following steps:

said mobile device sending an assistance request to said assistance server via a radio station associated with said mobile device, and said server identifying a clock bias between the common clock of the satellites and the clock of said radio station as updated by said mobile device receiving said satellite data, said mobile device calculating pseudodistances between itself and said satellites, encapsulating said pseudodistances with a time at which said pseudodistances are calculated, transmitting said pseudodistances and said time at which said pseudodistances are calculated in the form of a radio signal from said mobile device to said assistance server via said radio station, determining the position of said mobile device, and estimating the clock bias between the common clock of said satellites and the clock of said radio station using said pseudodistances and said time at which said pseudodistances are calculated.

7. A method according to claim 6 including a step of said assistance server transmitting assistance data including:

time information associated with said radio station extracted from the clock bias between the common clock of the satellites and the clock of said radio station as updated by said updating method, and the time of the common clock of the satellites extracted from the clock bias between the common clock of the satellites and the clock of said radio station as updated by said updating method.

8. A method according to claim 7, wherein said time information associated with said radio station is transferred as a reference time of the BTS radio signal in the form of hyperframe, superframe and multiframe references and a bit number, and the time of the common clock of the satellites is associated with said BTS reference date.

9. A method according to claim 6 including the following steps:

said assistance server transmitting assistance data including a clock bias between the common clock of the satellites and the clock of said radio station as updated by said updating method, and said radio station inserting into a radio signal sent to the mobile device the time said radio station sends said radio signal.

10. A method of calculating the position of a mobile device including a radio navigation satellite system receiver in an asynchronous cellular radiotelephone system, said method including the following steps:

an assistance server improving the acquisition of satellite data by said mobile device by said mobile device sending an assistance request to said assistance server via a radio station associated with said mobile device, and said server identifying the clock bias between the common clock of the satellites and the clock of said radio station as updated by an updating method comprising the following steps:

said mobile device receiving said satellite data, said mobile device calculating pseudodistances between itself and said satellites, encapsulating said pseudodistances with a time at which said pseudodistances are calculated, transmitting said pseudodistances and said time at which said pseudodistances are calculated in the form of a radio signal from said mobile device to said assistance server via said radio station, and said server determining the position of said mobile device and estimating the clock bias between the common clock of said satellites and the clock of said radio station using said pseudodistances and said time at which said pseudodistances are calculated, said mobile device acquiring said satellite data, said mobile device calculating pseudodistances between said mobile device and the satellites from said satellite data, and said assistance server or said mobile device determining the position of said mobile device.

11. A mobile device of an asynchronous cellular radiotelephone system including:

a radio navigation satellite system receiver; and means for determining the position of said mobile device by:

improving the acquisition of satellite data by said mobile device by said mobile device sending an assistance request to an assistance server via a radio station associated with said mobile device, and identifying the clock bias between the common clock of the satellites and the clock of said radio station as updated by:

said mobile device receiving said satellite data, said mobile device calculating pseudodistances between itself and said satellites, encapsulating said pseudodistances with a time at which said pseudodistances are calculated, transmitting said pseudodistances and said time at which said pseudodistances are calculated in the form of a radio signal from said mobile device to said assistance server via said radio station, and determining the position of said mobile device and estimating the clock bias between the common clock of said satellites and the clock of said radio station using said pseudodistances and said time at which said pseudodistances are calculated, the means for determining the position of the mobile device also:

acquiring said satellite data, calculating pseudodistances between said mobile device and the satellites from said satellite data, and determining the position of said mobile device.

12. A method of updating the clock bias between the common clock of the satellites of a radio navigation satellite system and the clock of a radio station of an asynchronous cellular radiotelephone system including a mobile device with a radio navigation satellite system receiver for receiving satellite data supplied by at least four satellites and exchanging a radio signal with said radio station and an assistance server for improving the acquisition of satellite data by said mobile device, said method including the following steps:

said mobile device receiving said satellite data, said mobile device calculating pseudodistances between itself and said satellites, and said mobile device determining its position and estimating the clock bias between the common clock of said satellites and the clock of said radio station using said pseudodistances and said time at which said pseudodistances are calculated, said time at which said pseudodistances are calculated corresponding to time information supplied by said radio station.

13. The mobile device of claim 11, wherein the time at which the pseudodistances are calculated corresponds to time information supplied by the radio station.

14. The mobile device of claim 11, wherein the time at which the pseudodistances are calculated is the time according to the clock of the mobile device at which the pseudodistances are calculated;

the means for determining the position of the mobile device also inserting into the radio signal the time it sends the radio signal;

the radio station inserting into the radio signal the time it receives the radio signal;

the assistance server determining a first clock bias between the clock of the mobile device and the common clock of the satellites, estimating a second clock bias between the clock of the mobile device and the clock of the radio station by establishing the difference between the sending time and the receiving time, and deducing the clock bias between the common clock of the satellites and the clock of the radio station by establishing the difference between the first and second clock bias values.

15. The mobile device of claim 11, wherein the clock bias between the common clock of the satellites and the clock of the radio station is stored in an update database.

16. The mobile device of claim 11, wherein the assistance server transmits assistance data, including the deduced clock bias between the common clock of the satellites and the clock of the radio station, and the radio station inserts into a radio signal sent to the mobile device the time the radio station sends the radio signal.

17. The method of claim 12, wherein the time at which the pseudodistances are calculated corresponds to time information supplied by the radio station.

18. The method of claim 12, wherein the clock bias between the common clock of the satellites and the clock of the radio station is stored in an update database.

19. The method of claim 12, further comprising:

the assistance server transmitting assistance data comprising time information associated with the radio station extracted from the clock bias between the common clock of the satellites and the clock of the radio station as updated by the updating method and the time of the common clock of the satellites extracted from the clock bias between the common clock of the satellites and the clock of the radio station as updated by the updating method.

20. The method of claim 12, further comprising:

the assistance server transmitting assistance data comprising a clock bias between the common clock of the satellites and the clock of the radio station as updated by the updating method; and the radio station inserting into a radio signal sent to the mobile device the time the radio station sends the radio signal.

* * * * *